Figure 1:
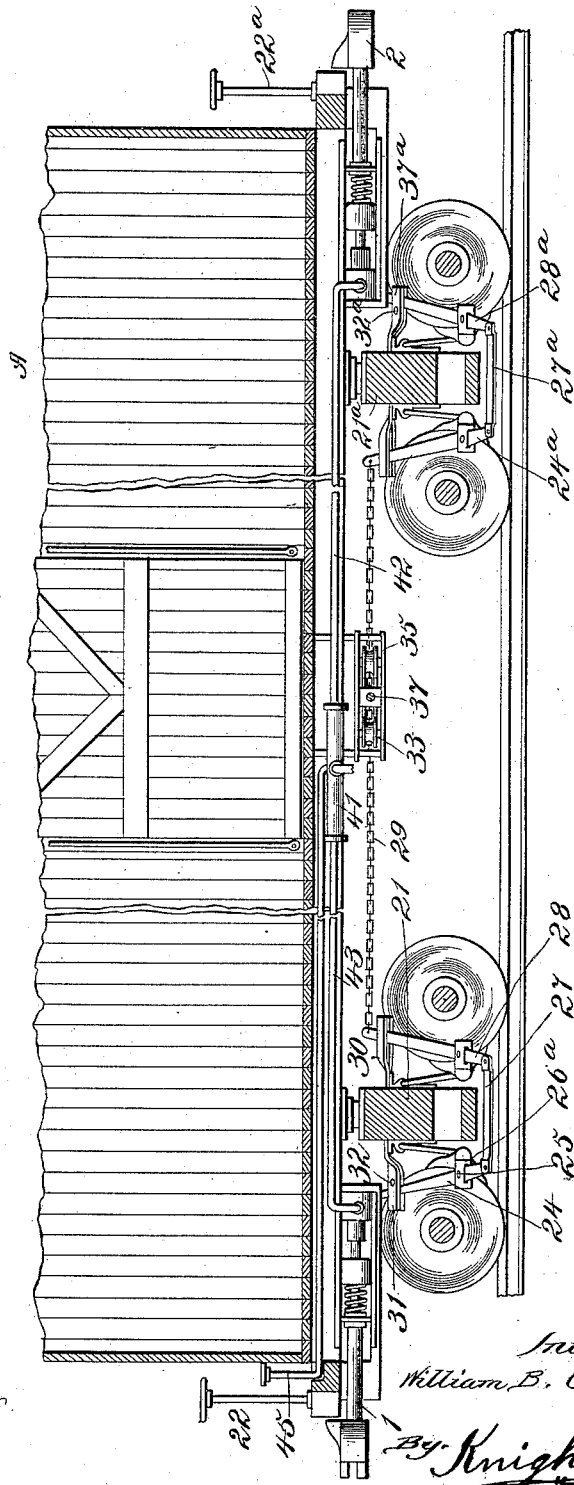

(No Model.) 6 Sheets—Sheet 1.

W. B. GUERNSEY.
AUTOMATIC TRAIN BRAKE.

No. 489,899. Patented Jan. 10, 1893.

Witnesses:
Harry B. Arthur.
Walter E. Allen.

Inventor:
William B. Guernsey,
By Knight Bros.
Attorneys (No Model.) 6 Sheets—Sheet 2.
W. B. GUERNSEY.
AUTOMATIC TRAIN BRAKE.
No. 489,899. Patented Jan. 10, 1893.
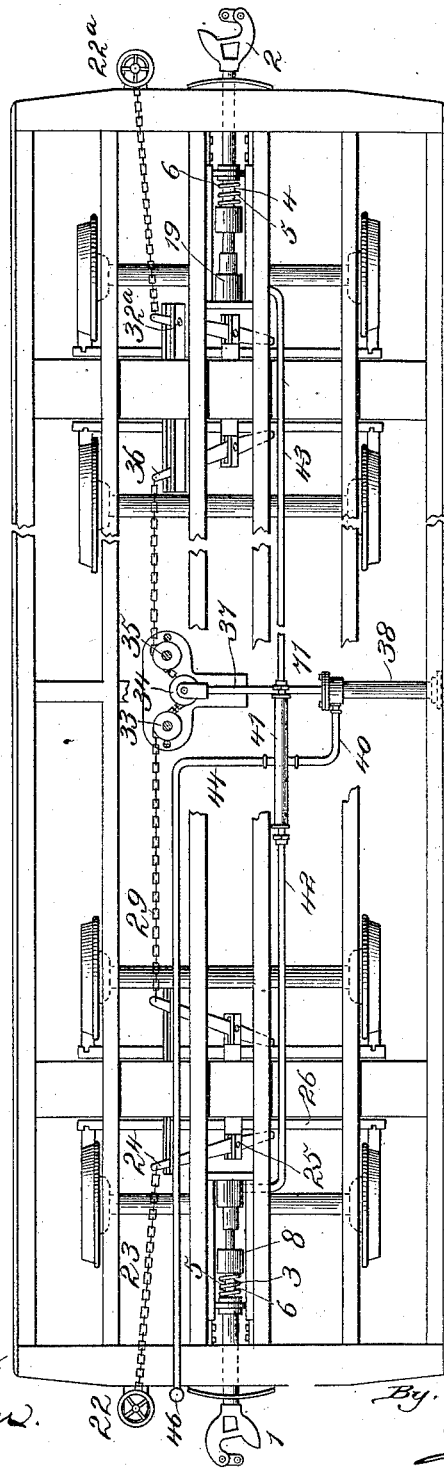
Witnesses:
Harry B. Rohrer
Walter E. Allen
Inventor:
William B. Guernsey
By Knight Bros.
Attorneys (No Model.)
W. B. GUERNSEY.
AUTOMATIC TRAIN BRAKE.
No. 489,899.
6 Sheets—Sheet 3.
Patented Jan. 10, 1893.
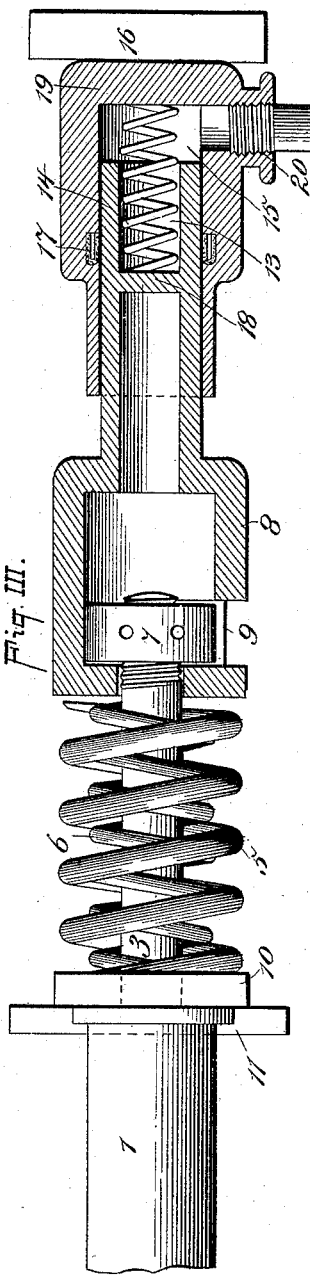
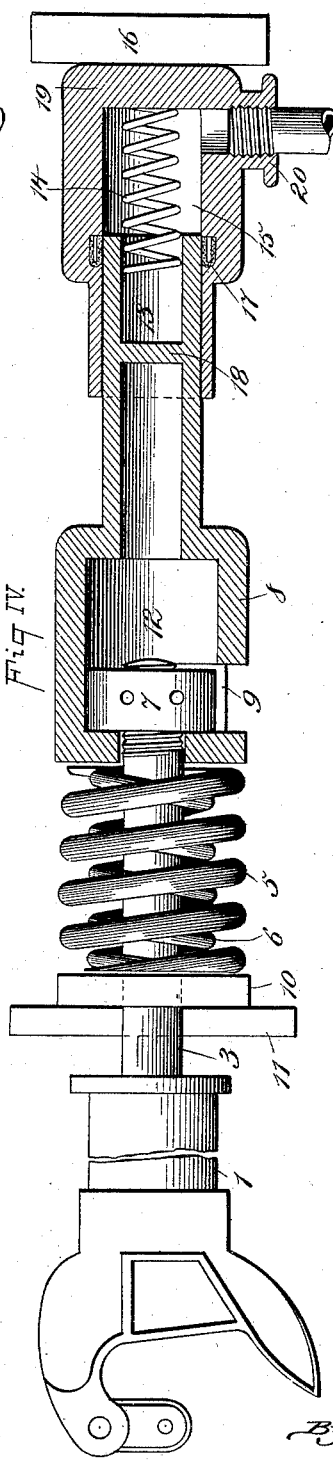
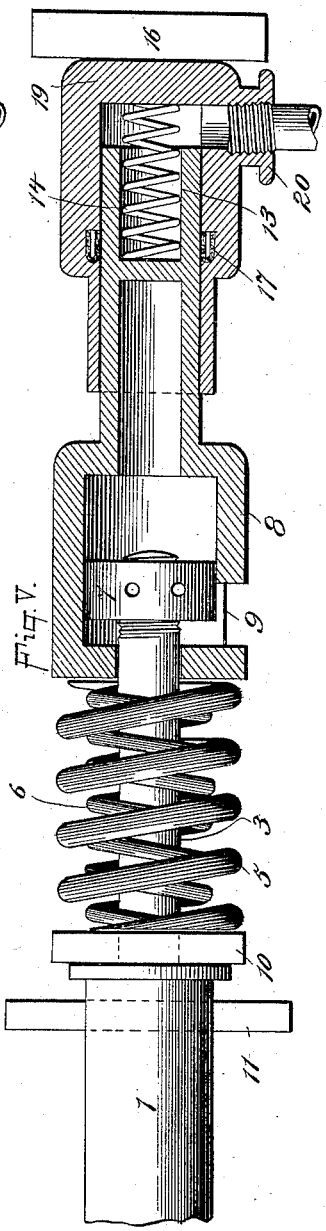
Witnesses:
Harry S. Rohrer
Walter E. Allen
Inventor:
William B. Guernsey.
By Knight Bros.
Attorneys

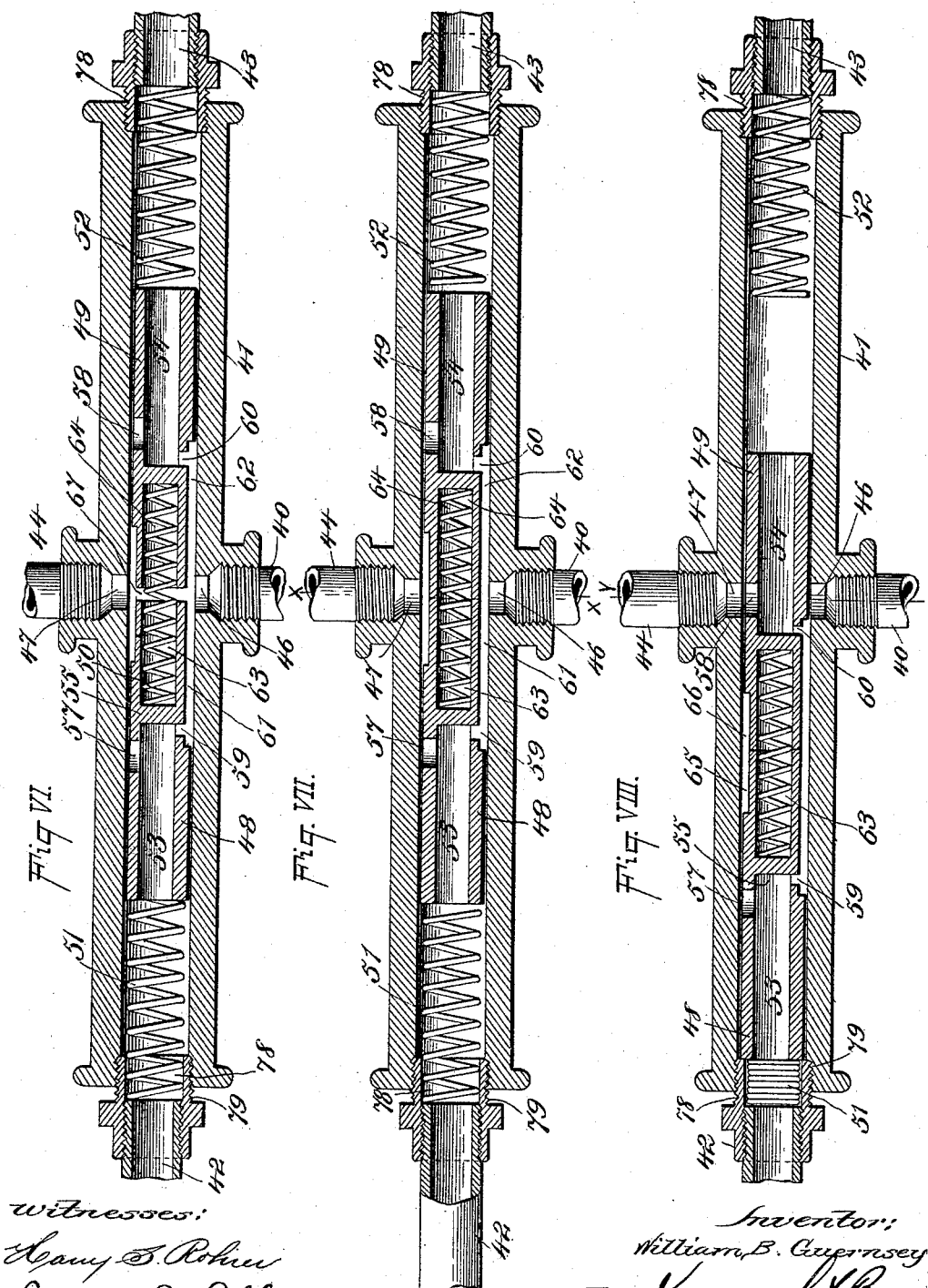

(No Model.)  6 Sheets—Sheet 5.
W. B. GUERNSEY.
AUTOMATIC TRAIN BRAKE.
No. 489,899. Patented Jan. 10, 1893.
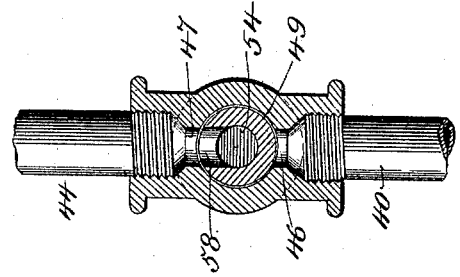
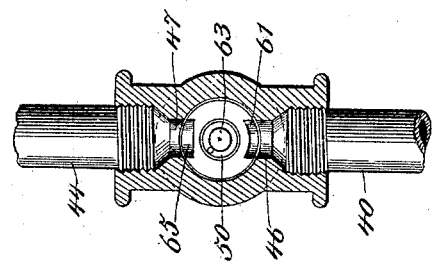
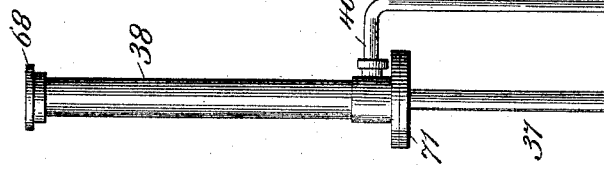

(No Model.) 6 Sheets—Sheet 6.
W. B. GUERNSEY.
AUTOMATIC TRAIN BRAKE.
No. 489,899. Patented Jan. 10, 1893.
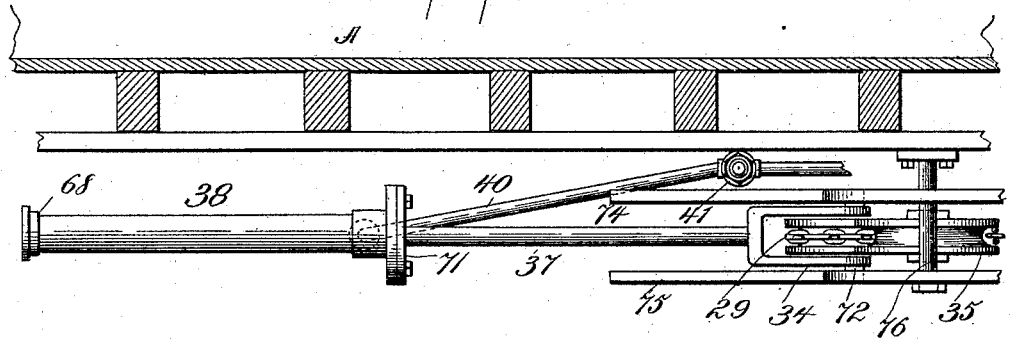
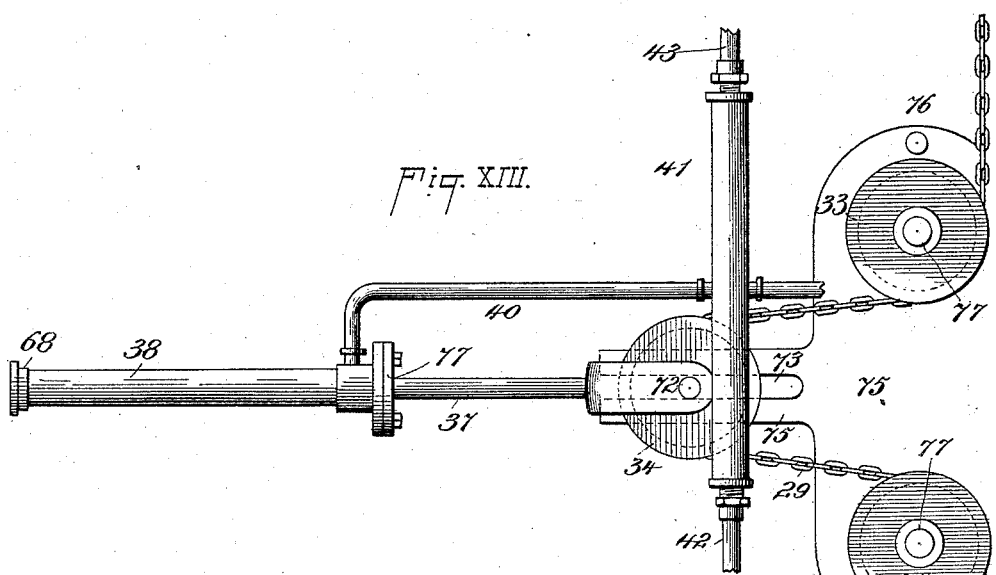
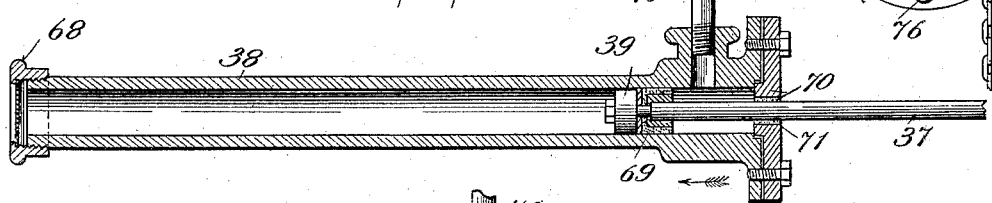
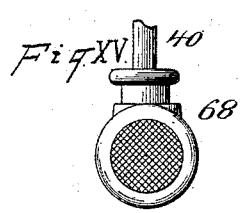
Witnesses:
Harry B. Rohrer
Walter E. Allen
Inventor:
William B. Guernsey
By Knight Bros.
Attorneys
THE NORRIS PETERS CO., PHOTO-LITHO., WASHINGTON, D. C.

UNITED STATES PATENT OFFICE.

WILLIAM B. GUERNSEY, OF NORWICH, NEW YORK, ASSIGNOR TO JANE M. GUERNSEY, OF SAME PLACE.

AUTOMATIC TRAIN-BRAKE.

SPECIFICATION forming part of Letters Patent No. 489,899, dated January 10, 1893.

Application filed November 22, 1892. Serial No. 452,795. (No model.)

*To all whom it may concern:*

Be it known that I, WILLIAM BELLAMY GUERNSEY, a citizen of the United States, residing at Norwich, county of Chenango, State of New York, have invented certain new and useful Improvements in Automatic Train-Brakes, of which the following is a specification.

The invention I am about to describe is an evolution of the broad principle enunciated by me in my previous United States patent No. 473,457, dated April 26, 1892, in which I laid down the novel proposition that a momentum brake machine could be operated automatically by reason of the synchronous or practically simultaneous inthrust movements of the drawheads upon any car of a train and rendered inoperative by their dissimultaneous or differential movements, which operations I held and now hold to be sufficiently exact and comprehensive in their ramifications to comply automatically and without the intervention of train hands to all condition of railway train or yard service, so that whenever brakes are wanted the braking machine will responsively co-operate with the application of brakes at the head of train at all times, will remain inoperative when brakes are not wanted, and will be automatically disabled when cars or trains are backed and will furthermore satisfactorily comply with all other contingencies and conditions of train or car service.

In the patent just referred to, I have shown, described and claimed certain mechanical devices for carrying my invention into effect so as to produce these results and my present invention which I will now describe is differentiated from its predecessor in so far as the actual construction of the apparatus is concerned, but so far as regards the principle which underlies them both they are in every respect similar and it is to be understood that the present device is a later outcome of the same general idea.

I have noted and have duly set forth in the above named patent that when cars are moving forward in a train and a braking stress is applied to the forward end of the train, a simultaneous or nearly simultaneous compression of drawheads throughout the train takes place. I have also noted that when a train is at rest and a motor or another car is pushed against such a train, the first drawhead of the first car of the train will be compressed to a certain extent before the said car is moved; such movement of the car taking place before the further drawhead on the same car is compressed and so on throughout the train at rest; which fact I have utilized to disable brakes. Under these two propositions are classed all the different conditions of train and car service in their relation to momentum brakes and it will be found by investigation that no matter what contingency is to be met with in practical operation, these two general propositions can be effectually utilized to operate or disable brakes accordingly as they are wanted or not wanted.

In my former patent, the drawhead pressures were communicated to the brake machine through the medium of buffer springs, and in the present case the drawsprings are utilized as buffer springs and the retractile movements of the compressed drawsprings are employed to compress fluids and apply brakes as will be described.

In my former patent, I employed a series of levers for communicating the braking stress on the inwardly moving drawheads to the brake shoes. In the present case, I eliminate such levers and substitute in lieu thereof a pipe connection containing a fluid which fluid serves as a means for transmitting the energy from the drawhead to the brake shoes and takes the place of the levers aforesaid.

In my former application, I employed a tripping or disabling device for governing the operation of the brakes and I have substituted in the present case a valve, communicating with both ends of the car. By reason of its peculiar construction it is made to govern the application or non-application of brakes through the medium of the fluid pressures aforesaid.

It will be seen by reference to my present construction that although I have not departed from the broad principle of my invention, I have materially altered and simplified its construction and have produced a much more satisfactory and commercially available contrivance.

For convenience of reference and for the purpose of distinguishing my present invention from the one heretofore described and claimed, I will refer to my present device as an independent or impact hydraulic train brake, the reason for this being that it is (and in this respect it resembles my former device) independent in its operation; that is to say, any car equipped with this brake will operate in response to simultaneous drawgear impacts, no matter what its position in the train is, and independently of the fact whether the other cars of the train are equipped with such a brake or not, which attribute differentiates it from such other so-called automatic, hydraulic or fluid brakes as require a through pipe connection from car to car and with the locomotive in order to render them effective and available. This serious drawback does not obtain in my invention as I have already stated and as I will proceed to show.

I employ the term "hydraulic" for the reason that I use a fluid and necessarily a liquid as will be explained and for convenience I prefer the word "hydraulic." The term "train brakes" is applied for the reason that it is essentially and in fact altogether a train brake and is not adapted to be used in connection with a single car; in fact, any car immediately upon its segregation from a train of cars has its automatic brake machine rendered *ipso facto* unavailable and inoperative.

The independent hydraulic train brake (my present invention) consists essentially of a hydraulic jack filled preferably with some non-congealable fluid such as mineral oil or glycerine, which jack has two pumps operated by the respective drawheads of the car. The "ram" is, in the present instance dissociated from the pumps, and placed in a convenient position for actuating brakes; and is arranged so as to be a pulling instead of a pushing motor, and is common to both sets of brake rigging. The pump appliances of the said "jack" are placed, one behind each of a car's drawgears, the pump plunger being the continuation and part of the after-follower of the drawgear apparatus. To the rear of each plunger, I provide a cylinder and between said cylinder and plunger is formed a chamber which is filled with the fluid aforesaid, each cylinder being connected through a governing valve by means of certain pipes to a second chamber or cylinder which I will term the working or brake cylinder, in contradistinction to the buffer cylinder just described. This working cylinder constitutes the ram aforesaid and is provided with a piston connected to the brake chain, which when pushed inwardly by means of the fluid flowing from the buffer cylinders to the said working cylinder, will, under certain predetermined conditions, draw upon the brake chain and through the medium of the brake levers and shoes, apply a braking stress corresponding to the amount of compression upon the drawhead. But, as it is well known, it often occurs that inthrust movements of the drawgears occur when the brakes are not wanted and therefore it is necessary to provide means for effecting the application of brakes only when needed. To this end, I provide, preferably centrally located as regards the car body, the aforesaid governing valve connected by pipes to the buffer cylinders as well as to the working cylinder, the construction of the valve being such that when the inthrust or impact movements of the two oppositely moving drawgears on the same car are practically simultaneous, bodies of liquid from the two buffer cylinders will flow in the opposite direction and toward each other at the same time, thereby closing the valve and thus causing the said fluid pressure to be delivered into the working cylinder and by this means applying the brakes, as will be described. The two "pumps" therefore, though otherwise entirely separate and independent of each other, are both adapted to operate the same "ram," and have connections to either side of this valve which I may also term a "balanced" "trip" or "disabling" valve, the shifting of which under differences of pressure from either side serves to let off the brakes; and it is these actions of the valve which insure the automatic application or non-application of the brakes in accordance with the needs of the car or train.

The balanced valve herein referred to takes the place of the tripping or disabling mechanism shown, described and claimed in my former application above described. In the present application when speaking of the tripping or disabling device or mechanism, I refer to this balanced valve which performs the office of the trip through the variable pressures of the opposed bodies of fluids.

In connection with the aforesaid valve is another liquid holding vessel or chamber which I term the reservoir. A pipe extends from and opens out of the valve and enters the said reservoir, affording under certain conditions, an outlet for the flow of the liquid through the valve chamber. When the valve is open, the liquid following the course of the least resistance, will flow, under pressure, into the reservoir, as the latter is provided with an aperture and has a free communication with the outside air. When the valve is closed, passage into the reservoir is cut off, and the liquid will be driven into the working cylinder.

I will now proceed to describe the accompanying drawings which form a part of this specification and which serve to illustrate my invention reduced to a practical and available form.

In the drawings; Figure I represents a longitudinal section of the lower portion of a car body. To this is attached the brake rigging, drawbar apparatus, and my improved brake machine. Fig. II represents a plan view of the same parts, the car body being removed. Figs. II<sup>a</sup> and II<sup>b</sup> are detail views. Fig. III is a plan view, enlarged, of the drawgear apparatus together with a sectional view of the after-follower and the buffer cylinder employed by me in carrying my invention into effect. In this view the parts are shown in their normal position. That is to say, their position when the car is at rest. Fig. IV is a similar view of the same parts but in a different position. In this view the drawspring is compressed and the parts are in the position they will assume when the car is moving forward and a pulling strain is applied to the drawbar. It is also the position of braking at the moment of the initial retarding pressure. Fig. V represents the drawgear apparatus and the buffer cylinder when an inward pressure has been applied to the drawhead of a stationary or backwardly moving car. This is the position the parts will assume when backing, pushing or kicking. It is also the position assumed when a continuous and excessive braking stress is applied. Fig. VI represents a horizontal longitudinal section of what I term my centrally located balanced valve in its normal position. Fig. VII represents a horizontal longitudinal section of the balanced valve in the position it will assume when the brakes are on. Fig. VIII is a similar view of the balanced valve in the position it will assume when the braking apparatus is disabled. Fig. IX is a plan view of the working cylinder, the balanced valve and the buffer cylinder and their pipe connections together with the piston of the working cylinder and brake chain pulleys. The parts are here shown in a position of rest. Fig. X is a cross section of the balanced valve on the line x—x, Fig. VI. The exit pipes are shown in elevation. Fig. XI is a similar view on the line Y—Y, Fig. VIII. Fig. XII shows a side elevation of the working cylinder, the piston rod, the brake chain pulleys and the supporting frame therefor. An end view is only shown of the valve. In this figure the parts are in their normal position and brakes are not applied. Fig. XIII is a plan view of the same parts in the position of brakes on. The piston rod is shown as pulled in and the brake chain drawn taut. Fig. XIV is a horizontal section of the working cylinder to a larger scale. Fig. XV is an end view of the working cylinder.

In the drawings, 1, 2 represent two drawheads upon either end of the car A. I prefer to employ couplings of the M. C. B. standard and have so shown them.

I will speak of the rear extensions 3, 4 of the drawheads as the drawbolts and of the drawhead and drawbolt combined as the drawbar; and of the drawheads, drawbolts, springs, &c. as the drawbar gear or apparatus or drawgear apparatus. The drawbolts are fixedly secured to the drawheads and are provided with springs 5, 6 which serve the purpose of draw-springs when the drawheads are being pulled as buffer-springs when they are being pushed upon and as brake applying springs during simultaneous retractile movements. The drawbolts are provided with nuts 7 by means of which they are secured to the after-followers 8, openings 9 being provided for obtaining access thereto. By means of this arrangement the drawbolts can be adjusted relatively to the after-follower, or it can be removed therefrom, as may be desired. The drawsprings lie between the after-follower 8 and the forward-follower plate 10, the latter abutting against the car timber 11 in its outward movement. The after-follower 8 is provided with a chamber 12 into which the drawbolt 3 extends. The drawbolt has a certain amount of longitudinal play in this chamber, limited by the compressibility of the drawsprings in the one direction, and the lock nut 7 in the other. The after-follower 8 is further provided with a hollow portion or chamber 13 at its farther or inner end in which is seated a spring 14 whose function will be hereinafter more particularly referred to.

The after-follower 8 at its inner end fits into what I will term a buffer cylinder 15 supported in any suitable manner on the car timber 16. This buffer cylinder contains the liquid hereinbefore referred to for conveying drawgear inthrusts to the brakes and it is the beginning of the fluid system which forms the basis of my present improvement.

Packings 17 are provided between the after-follower and the buffer cylinder and these, together with the great length of surface between their contiguous faces, serve to prevent leakages of the fluid.

The long neck or bearing which is a part of the gland, serves the further purpose of shielding and protecting so much of the plunger as ever passes through or in contact with the packings 17, from abrasion, or from any dust or sand that may be in motion under the car.

The drawgear apparatus which I have described, is the ordinary drawgear in common use, that is to say, the drawhead 1 having the drawbolt 3 with the double buffer and drawsprings 5, 6 the forward-follower 10 operating in conjunction with the immovable car timber 11, and serving as shown in Fig. IV the purpose of the usual drawgear apparatus; that is, when the cars are coupled together and are being drawn forward, the drawbar will be extended, the draw-springs compressed and the pulling strain will be transmitted to the car frame through the said draw-springs 5, 6. This much of my present construction is old and well known and I utilize it in carrying my invention into practical effect. The drawbar in assuming the position above described will pull upon, through the medium of the locknut 7, the after follower 8, drawing it out to a greater or less extent according to the severity of the pulling strain and the resisting strength of the drawsprings. By referring to Fig. IV of the drawings, the parts will be seen in the condition just described. It is obvious that as the after-follower retreats outwardly, it will cause the fluid contained within the buffer cylinder 15 to follow it, and in order to fill the enlarged chamber thus created between the wall 18 of the after-follower and the back 19 of the buffer cylinder, the fluid contained within the brake machine hereinafter described, will flow into said chamber through an opening 20, completely filling it as fast as it becomes enlarged.

I have heretofore stated that I convey the braking stress from the drawhead to the brakes through the medium of a fluid or liquid, and it is necessary in carrying my invention into effect, to keep the fluid or liquid in immediate juxtaposition to the after-follower at all times so that the fluid or liquid will immediately receive and respond to drawgear inthrusts. The liquid therefore follows the follower in its outward movements, presses against it, and constantly fills the entire chamber between the walls 18 and 19 so that in transmitting liquid pressures from the drawgear to the brakes, as will be hereinafter described, there will be no lost motion in the buffer cylinder itself; the pressures received therefore by the liquid in said cylinder will be immediately and fully transmitted. Hereinafter in speaking of the cylinder 15 and the pocket or hollow portion 13 at the inner end of the after follower, I will refer to the entire chamber thus formed as the buffer cylinder, thus including the pocket 13 in the term buffer-cylinder 15.

In describing my invention in respect to the above features, I disclose what I consider a novel point in momentum brakes and that is, the automatic following up of the outwardly moving drawgear by the pressure transmitting medium, so that, as before stated, responses to drawgear inthrusts will be immediate no matter in what position the drawgear is in.

I will now proceed to describe the brake rigging or foundation brakes and I may state that it is my intention to utilize the ordinary constructions now employed on railway cars merely adapting the details of my invention to the various details in use in different railway systems. The principle however, which underlies most of railway brake apparatus as far as the foundation brakes are concerned being substantially the same in all instances, I will describe a construction which can be easily explained in connection with the present brake machine.

Fig. I shows a side elevation of two railway trucks 21, 21ª, having a car body A mounted thereon; the connections will be seen in this figure as well as in Fig. II which represents a plan view of the running gear and frame of an ordinary freight car. The ordinary handwinch 22 is employed which connects by means of chain 23 with brake lever 24. The brake lever 24 is hung at 25 in brake beam 26 and extends through the hanger 26ª of said brake beam and is provided with a laterally arranged transmitting bar 27 which extends to the lower end of the corresponding brake lever 28 also hung in the brake beam; the latter being connected to my improved brake machine at its upper end by means of the chain 29. Longitudinal guides 30 and 31 are provided which serve to confine the brake levers to the proper plane of motion, a stop 32 being utilized to lock the brake lever 24, thereby affording a fulcrum under certain conditions as hereinafter described.

It will be seen from the above that the ordinary hand brake apparatus can be effectively used and that the brake machine which I am about to describe will not interfere with its operation in any way. In the construction herein described the brakes upon one truck will be fulcrumed against, and balanced by, the brakes upon the other truck of the same car, so that when the hand brake is applied at the end of the car it will apply brakes upon both trucks with self equalizing pressure. This is accomplished in the following manner: The brake chain 29 extends from the upper end of the brake lever 28 loosely through and around pulleys 33, 34 and 35 to the brake lever 36 upon the truck 21ª at the other end of the same car. As the truck and brake rigging upon this end of the car is in every way similar to the brake rigging on the other end of the car just described, I will not explain it as to detail, it being understood that both are exactly alike in construction and operation. The middle pulley 34 around which the chain 29 extends is shown in Figs. II, IX, XII and XIII, is mounted upon the end of a pull rod or piston rod 37. This rod extends into the end of what I term, the "working" cylinder or "brake" cylinder 38 and it is on the operation of this pull rod or piston rod by being drawn into the working cylinder, and thus pulling upon the brake chain 29, that brakes are caused to apply, for it can be easily seen that a sufficient pressure upon the piston 39, shown in cross section in Fig. XIV the pressure applying in the direction of the arrow, will cause the piston rod to travel inwardly and as it travels inwardly the chain 29 connected to the brake rigging will be drawn taut and through the operation of the brake levers, brake beams and shoes, will apply brakes the same as if applied by the hand winch 22.

The brake chain 29 has a sliding or what I may term a disconnected connection with the pulleys 33, 34 and 35 so that although it will respond to pulls upon the piston rod 37 the pulleys will not interfere with the free movement of the chain in either direction when the hand brake is being applied upon the front or rear end of the car. That is to say, when the hand winch 22ª is operated to apply brakes, the upper end of the brake lever 29ª is drawn outwardly thus applying brakes to the first pair of wheels. The longitudinal pressure will be communicated through the transmitting bar 27ª to the brake lever 24ª. The latter will then pull upon the chain 29 and brake lever 28; and from thence will press through the bar 27 upon the brake lever 24. Now it is important that the lever 24 should be provided with a fixed fulcrum in order to have the braking apparatus respond promptly and to this end the stop 32 is furnished so that as the upper end of the lever 24 tends to swing inwardly it will be prevented from doing so by reason of said stop thus compelling brakes to go on through the entire series of foundation brakes. If the braking stress is applied at the hand winch 22 the stop 32ª upon the further truck will perform a similar office. So, also, when the brakes are applied through the working cylinder the chain 29 will be drawn inwardly toward the center from both directions and with a self equalizing force. The stops 32 and 32ª will both afford fulcrums to the braking apparatus when this action takes place.

It will be seen from the above that either the hand apparatus or the automatic apparatus can be applied independently or they can both be used together without interference with each other.

It is one of the principal objects of my invention to cause the piston and piston rod with the pulley 34 which it carries, to be drawn inwardly only when it is desired that brakes should be applied and as the operation which I have described depends upon the flow of the fluid or liquid through the pipe 40, the regulation of said fluid movements is of primary importance.

To provide for, and to regulate and determine the flow of the liquid into the working or braking cylinder 38, I provide connections between said working or braking cylinder and the plunger or buffer cylinders 15 situated at both ends of the car, such connections consisting of the following parts, to wit:—The pipe 40 extends between and connects the working or braking cylinder 38 with a centrally located valve chamber 41 and the pipes 42 and 43 extend from the said valve chamber to the buffer or plunger cylinder 15. When fluid pressures flow inwardly toward the center of the car through the pipes 42 and 43 and valve 41, they will be directed under certain conditions and positions in either one of two different directions after they reach the said valve chamber 41. If the inwardly flowing pressures are simultaneous or practically simultaneous, I desire the fluid pressures to flow through the pipe 40 and into the working cylinder 38 thereby causing the piston and piston rod to be drawn upon and through such operation and the connections hereinbefore described apply the brakes upon both trucks. If however such inwardly flowing pressures are dissimultaneous, I desire that brakes should not go on and therefore provide means for conveying such pressures not into the working cylinder but into another chamber which forms what may be termed an overflow or storage reservoir and into which said pressures can ebb and flow and from which the entire machine can be fed with the proper liquid from time to time as it needs renewing or refilling. The device for providing for the overflow is shown in Figs. I and II.

A pipe 44 extends outwardly from the valve chamber 41 and preferably centrally therefrom and connects at one end of the car with a vertical pipe or standing tube 45 which together with the pipe 44 will serve as the reservoir aforesaid. The upper end of the standing tube may be seen in detail in Figs. IIª and IIᵇ. Fig. IIª represents a partial sectional view to a larger scale and Fig. IIᵇ a top view.

I provide a cap 46 perforated as shown which may be screwed on the top of such reservoir pipe. This cap is shown in Fig. IIᵇ. It will be seen that the pipe is open to atmospheric pressure and that as the liquid ebbs and flows in the pipe 44 and standing tube 45, it will not be interfered with but can freely move back and forth. It will also be seen that the reservoir pipe and standing tube are placed on a somewhat higher level than the valve and the tubes or pipes which connect such valve the buffer cylinder and the working cylinder so that the fluid will flow by gravity from the reservoir into the other portions of the brake machine. It will also be seen that the supply of liquid can be easily renewed by filling from the standing tube 45 either with or without removing the perforated cap 46.

I will now proceed to describe the construction and method of operation of the valve 41. In the first place whenever I speak of the valve 41, I wish to be understood as including the valve chamber proper together with its contained parts which operate to produce the effect which I am about to describe. Whenever however, I speak of the valve chamber 41, I desire simply to be understood as referring to the chamber or casing itself. The valve chamber 41 is shown in longitudinal section in Figs. VI, VII and VIII. A cross section of Fig. VII on the line $x—x$ is shown in Fig. X and a similar section of Fig. VIII is shown in Fig. XI, the only difference being that the interior working parts of the valve have assumed a different position owing to the different conditions, but as far as the valve chamber is concerned, the line of cross section is the same.

As before stated, the pipes 42 and 43 extend from the buffer or plunger cylinders 15 to the valve chamber 41 opening preferably into both ends of said valve chamber and connecting preferably by means of screw joints therewith; they connect also in a similar manner with the plunger cylinders at the openings 20. The pipe which leads from the valve chamber into the working or braking cylinder is shown at 40, and the pipe which leads from this chamber to the reservoir is shown at 44. As is shown in Fig. XII the pipe 40 slants downwardly toward the working cylinder 38 which will of course place the valve chamber upon a higher elevation than the working cylinder. The pipes 40 and 44 are arranged preferably opposite to each other and are both centrally located in relation to the length of said chamber and at right angles to it; the openings therefrom into the pipes are therefore directly opposed and in the present instance I have made them of the same diameter and superficial area. The port or opening into the pipe 40 is shown at 46, and the opening into the pipe 44 is shown at 47, and the pipes are attached to the valve chamber by screwing, so as to produce effective sealing joints.

In the practical operation of my brake machine it is necessary to keep the valve chamber 41 the connecting pipes 42 and 43 and the plunger or buffer cylinder 15 constantly filled with the liquid which constitutes the power conveying medium and consequently when the liquid pressures are received into the valve chamber 41 through the pipes 42 and 43 from the said buffer cylinders, it is necessary for the liquid to find an outlet, and as before stated, the pipes 40 and 44 are provided for this purpose. When I desire brakes to go on, I direct the flow of the fluid from the valve chamber through the pipe 40, and I accomplish this by means of certain moving parts within said chamber. When however, I desire the brakes not to go on, the fluid pressure is directed into the pipe 44 and this action is caused by the same moving parts within the valve chamber. The difference of direction in the outflow of the fluid from the chamber is caused by the different positions assumed by the moving parts of the valve, and these in turn are entirely controlled by the natures of the inflows into the chamber.

As hereinbefore stated, the main object of my invention is to utilize to the best advantage the discovery which I have heretofore made respecting the differential actions of drawheads or drawgears upon the same car under different conditions of train service, and the present invention is simply another practical embodiment of a machine adapted to carry this idea into effect. To transmit the differential actions of the drawgears to the brake machines in the most adequate manner, I employ the liquid medium as aforesaid, and in conveying drawgear pressures to the brake rigging, I have, in accordance with the proposition previously laid down, found it necessary to sift or sort the different kinds of pressures in order to utilize such different pressures for their proper and intended purposes. It is necessary in carrying my invention and idea into practical effect, so as to produce a construction which will be commercially valuable, to take into consideration the necessity for utilizing the combined inthrusts from both drawgears but it is not only necessary to add or combine these opposed pressures ultimately, but to produce the proper effect it must be done with a certain degree of simultaneousness. The two pressures therefore from the opposed drawgears must not only be added to each other to apply brakes, but they must be added instantly, in order to act. I therefore lay the greatest stress upon the question of time, and it is, as will hereinafter appear, the most important factor in carrying my invention into effect. With this fundamental principle in view, I will proceed further to describe the workings and construction of the valve. Within the valve chamber 41 I provide two moving or sliding parts 48 and 49. These parts are shown in their normal position; that is to say, the position at rest, in Fig. VI. They are both exactly alike in every respect and I speak of them as the twin slides. They are held in position by the centrally located spring 50 and the end or seating springs 51 and 52. The slides 48 and 49 are at their outer ends tubular in shape and are of a size to fit snugly the interior of the valve chamber 41. The tubular or central longitudinal ports 53, 54 extend from the outer ends toward the center and terminate in the walls 55, 56. Ports 57 and 58 are provided, said ports opening out from the tubular slides, and which are adapted under certain conditions to register with the port 47 of the pipe 44. In Fig. VIII the port 58 is shown as opposite to, and as registering with, the port 47 and it will be seen that when the parts are in this position the fluid entering pipe 43 and flowing into the valve chamber will be enabled to pass through the tubular slide 49, and ports 58 and 47 into the pipe 44 and so into the reservoir system. Under these conditions and positionings of the moving parts the pressure transmitting liquid will be prevented from penetrating the working or braking cylinder 38 through the pipe 40 and brakes will, as a consequence, not be applied, the twin tubular slides serving the purpose of a trip or disabling device for the pending movement. This point will be explained farther on. The twin tubular slides are also provided with ports 59, 60 which open into longitudinal passage-ways 61, 62 which extend along for some distance and as far as the inner ends of the tubular slides. These passage-ways can be seen in the cross section view in Fig. X.

The ports 59 and 60 and the longitudinal passage-ways 61 and 62 afford means of access to the port 46 of the pipe 40 and it is by these means that liquid pressures are conveyed to the working or braking cylinder 38. It will be observed that these passageways are free and clear when the twin tubular slides are close together as shown in Fig. VII whereas the ports opening into the reservoir pipe 44 are entirely closed and shut off; when the ports are in this position the brakes are on. But in any event there is always a continuous way between the two buffer cylinders and the two sides of the valve by means of the passage-ways 61, 62 and the ports 59, 60.

Normally as will be seen by referring to

Fig. VI, the twin tubular slides are kept somewhat apart. This position is maintained by two separate and distinct causes. In the first place the centrally located spring 50 which is incased in the pockets 63 and 64, extends outwardly as far as the walls 55 and 56 of the tubular slides, and exerts an outward pressure against the said slides when there is a tendency to press them together. This outward pressure is of course infinitely small as compared with the enormous liquid pressures which are brought upon these slides when hydraulics are applied; but when these great pressures are removed, then the spring will operate to separate the slides in the manner indicated.

The second cause for keeping the slides normally apart is the atmospheric pressure which will operate in the following manner:— When brakes are on and the tubular slides are in close juxtaposition as shown in Fig. VII, the liquid is pressing against the outer end of the tubular slides, and against the walls 55 and 56. This action will cause the slides to be pressed together with great force. The fluid is also pressing into and through the pipe 40 and up against the under surface of the tubular slides above the passage-ways 61 and 62. When the drawgears retreat outwardly the fluids will flow back toward the ends of the car and the pressure against the tubular slides being removed they will be ready to assume their normal positions. By referring to the drawings of the valve it will be observed that on the top of the tubular slides I cut away certain portions, shown at 65, 66 which cut away portions open into the port 47 of the reservoir pipe 44. As before stated, the reservoir system is open to atmospheric pressure and as the liquid falls or flows away from the tubular slides toward the ends of the car, the said atmospheric pressure will exert itself and force the liquid into the chamber 65, 66 thus compelling the tubular slides to separate and by this means permit the immediate escape of the liquid from the working or braking cylinder 38 and allow it to pass through the now separated tubular slides into the pipe 44 and thus into the reservoir system.

As I have before stated, when liquid pressures are forced into the working or braking cylinder 38 by reason of the simultaneous inthrusts of the drawgears, and the closure of the valve is effected by reason of the tubular slides being forced together, the resultant action will be a pull upon the piston 39 and piston rod 37, and upon the brakes through the intermediate brake chain 29 and rigging hereinbefore described. Now, so long as the slides remain closed and the working cylinder full and under pressure, the brake chain 29 will remain taut, which will be the position of "brakes on." As soon however, as there is any relaxation on the inward pressure from the drawheads, the tubular slides as before stated, will immediately respond to the outward flow of the fluid, and permit the liquid to escape through the aperture 67 between the tubular slides, as shown in Fig. VI, to the relief system. As soon as this takes place, the pressures being removed from the braking or working cylinder, the piston and piston rod will be permitted to fall back, and brakes will drop off.

In transmitting drawgear pressures through the medium of the drawsprings as I have shown them, it will be noticed that the first result of the decrease in speed at the head of the train, as by the application of driven brakes, will be the release from pressure of the drawsprings and sequentially their expansion. As the fluid has followed the drawgear in its outward movement the drawsprings in expanding will drive the fluid in so that brakes will be first applied by the expansion of the drawsprings. This I regard as tributary to the main idea, namely, the drawgear pressures as I regard the drawsprings as simply a resilient member of the drawgear; hence when I speak specifically of the brakes being applied through the resilience of the drawsprings the statement is included in the generic assumption that brakes are applied by the drawgear movement, and the general statement of drawgear pressures or drawgear inthrusts includes the resilient action of the drawsprings when relieved of pressure or the inthrust of the drawbar as well as the drawsprings. In either case, the moving part is in and forms a part of the drawgear apparatus. Of course in heavy or continuous braking stresses where sandwiched cars are bunched by the forcible retardation of the train, drawbars and springs will both be forced inwardly and will assume the position shown in Fig. V and in such cases the springs will simply be an element in the conveyance of the pressures and will not form the source of supply of the said pressures. In so far then as the initial application of brakes by the retractile action of the compressed drawsprings is concerned my invention is differentiated from what are known in the art as momentum brakes. In fact in this respect, it is not a momentum brake as brakes are not initially applied by reason of the momentum of the train. When also a train is being retarded by an application of a braking stress at its head, and it gradually comes to a state of rest, the pressure upon the brakes will gradually cease by reason of the spring drawgear arrangement, which will force the drawbars outward into their normal positions and spread the cars apart so that the inward pressures upon the power transmitting liquid will be removed. By experiment I have ascertained that when trains are brought to a rest upon an approximately level road the spreading of the cars apart by the natural expansion of the buffer springs will permit the brakes to drop away from the wheels the moment the train comes to a stand still.

I have now described a brake machine and connections to the foundation brakes which are adapted according to the theory I have advanced to comply automatically with all conditions of railway train service. Before proceeding to a minute description of its operation there are certain details of construction in the present apparatus which I wish to dwell upon further after which I will set forth what I consider the strictly novel points in the claims.

Referring to the drawgear apparatus shown in Figs. III, IV and V, I wish it to be understood that this is simply a preferable form or arrangement, and that my invention is adapted to be utilized to a greater or less degree of efficiency with all drawgear arrangements in general use. It is manifest however that some constructions are more easily adapted to carry my invention into effect than others, and I may remark that the master-car-builders' standard such as I have shown and described is best adapted to carry my invention into practical effect. In other words, the lost motion between the couplers in master-car-builders' standard is very slight, and consequently the feature of shock which would obtain to some extent in the ordinary link and pin coupling would be substantially eliminated by the employment of standard couplings so that when the braking stresses are applied to the head of trains, the communication of the backward pressure will be practically instantaneous. The rapidity of its transmission depends upon the speed of the moving train; in other words, the faster a train is moving the quicker brakes will be applied. In this respect of course, it will operate in a manner similar to the well known principle of momentum brakes. Also in speaking of the "foundation brakes" or "brake rigging" I do not wish to be understood as limiting myself to any particular arrangement in this respect.

I have shown, and described an ordinary system of brake rigging suspended from both trucks of the car and connected to the ordinary hand brake in such a manner that the hand brakes can be operated independently, and at the same time enable my improved machine to be applied without any shifting or change in the hand brake apparatus. Also when speaking of the foundation brakes or of the brake rigging in the specification and the claims, I desire to be understood as referring to the brake beams, the hangers for supporting them, the brake levers suspended in the hangers of the brake beams, the brakes shown attached to the brake beams, the longitudinal guides in which the brake levers work, the fulcrums 32 and 32$^a$ against which the brake levers abut, the lateral transmitting rods 27 and 27$^a$ and the connecting brake chain 29. If, however, I specifically mention the brake chain 29, it is to be understood that I inferentially eliminate said brake chain from the expression foundation brakes or brake rigging. Also in referring to the working or braking cylinder and its method of co-action with the foundation brakes. I have shown and described the working or braking cylinder 38 as arranged transversely to the car body A and it can be seen in this respect in Fig. II of the drawings. When liquid pressures are received through pipe 40 into the working cylinder and compel the piston to travel outwardly toward the end of the working cylinder (see Fig. XIV) it is manifest that any opposition upon the outside of the piston 39 would interfere with the discharge of its proper functions. I therefore provide at the outer end of the said working cylinder a perforated cap 69 open to the atmosphere and arranged so as to protect the interior of the cylinder without interfering with the proper movements of the piston. I provide also packings 69 upon the piston and suitable packings 70 between the piston rod 37 and the cylinder head 71, all of which will co-operate to produce practically efficient and fluid tight joints to prevent leakage. It will be seen by referring to Fig. II that the working or braking cylinder 38 is located approximately in the center of the car and I prefer so to locate it. This working or braking cylinder is really a motor and although its operation is regulated by the valve, it nevertheless discharges the functions of a motor, and I wish it to be understood as such. Whenever therefore I speak of the motor for applying brakes, either in the specification or claims, I refer to the working or braking cylinder. This motor also discharges the functions of the ram hereinbefore spoken of and operates in conjunction with the plunger cylinders (which I consider the pumps) and in this manner I produce a complete hydraulic apparatus involving all the well known principles of ordinary hydraulic rams in combination with a brake apparatus, and I so arrange it that each car will be separately and effectively equipped with an independent apparatus adapted to apply and maintain brakes when they are wanted, and to disable them when they are not wanted.

The equalizing pulley 34 which is carried upon the end of the piston rod 37 turns upon a pivot 72, the latter being adapted to travel in the lateral ways 73 of the supporting frames or plates 74 and 75. These frames or plates are attached to the car body A by means of pins 76 as shown in Figs. XII, XIII. The frames also serve as guards to protect the pulleys 33, 34 and 35, and maintain them in their proper positions. The pulleys 33 and 35 are mounted upon pinions 77 secured to the said guards or frames, and have a rotating movement therein. The central pulley 34 has a sliding as well as a rotating movement and moves backward and forward with the piston rod, drawing the chain 29 taut and releasing it in the manner hereinbefore described.

In Figs. IX and XII the brake chain 29 is loose and brakes are off. In Fig. XIII however, the piston is drawn in and the brake chain 29 is taut; the position of brakes on.

The construction of valve which I have shown and described, although adapted to carrying my invention into practical effect, may be modified in various particulars without departing from the spirit of my invention in this respect.

It is of the highest importance that the valve, whatever its details of construction may be, should be so arranged as that it will automatically respond to all car and train movements so as to carry out the purpose of my invention without the necessity of manual adjustment for, as before stated, I maintain that this improved brake machine will practically dispense with the need of intelligent supervision of brakes, and that after a car is once equipped and put in order for working, the only attention that will be required will be a renewal of the liquid necessary only in case of accidental leakage and the supervision of packings. To attain this desirable end is one of the objects which I have diligently sought for in endeavoring to perfect my invention. In providing a proper valve however, it is necessary to keep in view the importance of its thorough automatism, and more especially its capacity to decide or determine the nature of the liquid inflows and discriminate between the simultaneous and dissimultaneous pressures.

It is quite apparent that the valve such as I have shown and described, although it may be modified in various ways, is adapted to automatically decide or determine between the pressures resulting from the simultaneousness or differential drawgear inthrusts. It is also desirable to so arrange the valve that when drawgear inthrusts are removed or withdrawn, the moving parts of the valve will instantly return to their normal positions. To this end I have provided means for separating the tubular slides 48 and 49 and utilize for that purpose the centrally located spring 50, and I also take advantage of the atmospheric pressure through the reservoir system in the apertures 65 and 66 as hereinbefore described. These two forces singly or jointly produce the desired result, to wit: the spreading apart of the tubular slides upon removal of adverse pressures. It is necessary also to limit and control the moving of the tubular slides outwardly and for this reason the springs 51 and 52 hereinbefore mentioned are provided. When the tubular slides are at rest as shown in Fig. IV the end or seating springs 51 and 52 are not under pressure. When however, the slides have been driven to the extreme position as shown in Fig. VIII, the spring 51 will be compressed into the pocket 78. When in this position the tubular slide 48 will find a seating upon the shoulder 79 at the moment the port 58 registers with the mouth 47 of the reservoir or relief pipe 44. When the liquid pressures are withdrawn the spring 51 and the atmospheric pressure return the tubular slides to their normal central positions.

When I speak of a brake-machine or a brake-applying-machine in the claims or elsewhere I include in this term the buffer cylinder, the operating or braking cylinder or motor and the balanced valve and their pipe connections equivalent to these and adapted to perform their functions in substantially the same manner.

The expressions "hydraulic brake machine" and "fluid containing brake machine" are also terms practically equivalent with each other and with the above and in every case, more particularly as regards the claims, I have employed the phrase which the structure of the sentence demands or appears to harmonize with. When however certain features are specifically mentioned in connection with any of the above phrases they are inferentially eliminated therefrom in such instance.

It is manifest that any fluid more imponderable than a liquid would be wholly inadequate for the reason that its condensability in taking up the absorbing drawgear inthrusts instead of transmitting them intact, would render the action of the brake machine uncertain and abortive, I therefore limit myself and desire my claims to be considered to be limited to a liquid, it being understood that the term fluid as employed by the office although having a broader and more generic signification is intended in the present instance to refer specifically to "liquids" or "hydraulics."

The method of operation of my improved brake apparatus is as follows:—When simultaneous inthrusts in the drawgears of the same car occur the liquid contained in the buffer cylinders will flow inwardly from said drawgears toward the center of the car and will meet in the center of the car at substantially and approximately the same instant. The valve being centrally located as regards the car and the tubular slides being balanced therein, as shown in Fig. VI, the pressures reaching the outer ends of the tubular slides at the same moment will drive the said slides toward each other and effect a tight joint or closure as shown in Fig. VII. As soon as the slides are brought into this close relation to each other, it will be seen that the opening 67 will be entirely closed and pressures containing the fluid will be compelled to flow through the ports 59 and 60 and thus through into the pipe 40 and into the working cylinder 38. From the description which I have heretofore given it will readily be seen that when this condition happens, brakes will go on, and as I have already explained this simultaneous action of drawgears will only occur when brakes are wanted. When however one drawgear inthrust is separated from the inthrust of its fellow drawgears by a distinct difference in space or time the inflow of the liquid from the first moving drawgear will cause one of the tubular slides, such as slide 49 shown in Fig. VIII, to be driven inwardly to such an extent that it will displace the opposite slide 48 from its normal position and drive it outwardly to the extreme end of the valve chamber. The pipe 43 together with the valve chamber, the opening 54 and the port 58 of the tubular slide and the opening 47 form a continuous way or conduit to the reservoir system, which being open to the ordinary atmosphere will receive the liquid being driven in and effectually prevent liquid pressures from being transmitted to the motor or brake cylinder 38. This condition as I have before explained will happen when brakes are not wanted. There is another condition of railway service which my improved braking apparatus is adapted to respond to and that is when slight changes in grades occur or any ordinary variation in speed takes place the brakes will not go on although the inthrusts of drawgears may in many such instances be practically simultaneous. The reason of this is that I have provided a continuous and permanent way or conduit from one buffer cylinder to the other and a normally open vent from such conduit into the relief or reservoir system so that the liquid can leak through the open ports from one side of the brake machine to the other and from the brake machine into the reservoir without effecting any change in position of the tubular slides. As above stated these leakages will occur from time to time and more especially when there is a tendency on the part of the train to "bunch" as will happen when the train is moving through a sag in the road bed and also when there is a slight decrease in speed at the head of the train. In such cases, the pressures being quite gradual the resultant action will be a leakage of the liquid through the opening or vent 57 into the reservoir system and the consequent inaction of brakes. When, however, sudden and violent inthrusts of drawgears occur, as the result of the application of driver brakes, the inflows of liquid will be so powerful that the tubular slides will be thrown against each other, thus instantly effecting the closure of the vent 67. It is to be understood therefore, that when I speak of the application of brakes, resulting from the simultaneous inthrusts of drawgears, I refer only to sudden or violent inthrusts and not to inthrusts resulting from the causes just indicated.

The dimensions of the different parts will be altered to suit the varying conditions and proportions of cars employed. For the ordinary freight cars the area of the pumps or buffer plunger is seven and one-half inches (diameter, three and one-eighth inches); so that a compressive force of nine tons upon a drawbar will give a fluid pressure of two thousand four hundred pounds per square inch. The area of the ram piston will be one and one-fourth inches (diameter one and one-fourth inches) so that its movement is six times greater than that of the drawbar, and its force one-sixth as great. The foundation-brake bearings are such that three thousand pounds of ram effort gives ten thousand pounds of shoe pressure; consequently, as both drawbars must be considered, nine tons drawbar compression gives ten tons of brake-shoe pressure upon the car; counting hinderance as one-fifth of brake-shoe pressure, a brake upon the locomotive and tender capable of exerting forty-five tons of brake-shoe pressure would compel nine tons of drawbar compression upon both drawbars of every car in train behind it.

Cars equipped with hydraulic brakes and coupled in train behind a locomotive equipped with an independent power brake controlled by the engineer, will never hinder the starting of the train nor its movement forward at any speed nor at or during ordinary changes in speed caused by grade, &c., but will have their brakes applied whenever the locomotive is quickly slowed as by the application of its own brakes. It is thus an efficient train brake, nor is it material in which direction the train is being pulled nor which end of the car is foremost in the train, nor in what part of the train the car is placed. Nor is it necessary that anyone on the train, or in the yard or station from which it started, shall know or have known that such a brake was upon the car. If, to such train, a "pusher" engine comes up behind and applies its force in assistance, there will be no impediment offered by the hydraulic brakes. Neither if the pushing commences while the train is at rest, or while it is moving forward at any rate of speed, nor if its pressure and efforts are unknown to every train hand on the assisted train. If, while such train is in motion to the front, a violent breakaway occurs, the hydraulic brakes upon rear sections will be set and will stop such sections. But said brakes upon the engine or leading section will not act.

The reason of the application of brakes in the rear section lies in the fact that the drawbars being drawn out or expanded a sudden release from this pull will enable the drawsprings to rebound against the bodies of liquid immediately in the rear of the after followers, see Fig. IV, and the rebound being sudden and simultaneous, brakes will go on. This is approximately the same action as heretofore described in respect to the initial application of brakes by the retractile action of the relieved springs. If such train be stopped and backed, its brakes being off at commencement of movement, there will be no hinderance from its brakes so long as said movement continues.

In the yard, cars equipped with said brake can be pulled, pushed, kicked or backed, at any and all speeds without hinderance from their brakes and all this upon the assumption that no one in the yard or connected with the road knows even of the presence upon said cars of said hydraulic brakes much less has any manual adjustment to make of same.

It will be noted that this brake has no connection with nor dependence upon the trucks' wheels or axles of the car nor any relation to nor dependence upon its speed or direction of movement.

The independent hydraulic brake automatically distinguishes between those initial inthrusts of drawgears which are the result of the car's own excess of momentum and such initial inthrusts as result from the propulsive impact of other vehicles. These last do not apply brakes. The other, or momentum inthrusts do, and these results are irrespective of speed and demand no manual attention or supervision to adapt them to changes of car or of train direction. If the initial drawgear's compression tends to move the car, its brakes never hinder. If, on the contrary, such inthrust tends to stop or hinder the car, its brakes will instantly and effectively assist. Its simplicity, unobtrusiveness and effectiveness are apparent. It performs everything automatically that is required of a brake, demands no changes in car construction nor in foundation brakes or hand brakes; does not interfere with the air brakes if any, requires no connection between cars except the usual car couplings, and works independently of every other vehicle in train.

In the claims where the term drawgear inthrusts or pressures is employed it is intended to include spring pressures, drawbar pressures or a combination of both.

Having thus described my invention, the following is what I claim as new therein and desire to secure by Letters Patent:—

1. A hydraulic brake machine connected to the brake rigging and the drawgears and adapted to transmit drawgear pressures to the brakes, substantially as shown and described.

2. A fluid containing brake machine, provided with a valve, connected to the brake rigging and the drawgears and adapted, through the closing of the valve, to transmit drawgear pressures to the brakes, as set forth and shown.

3. In a brake operated through the medium of fluid pressures, the combination of the drawgears, the brake rigging, a fluid containing brake machine connected to the drawgears and the rigging, and a disabling valve for rendering brakes inoperative, substantially as shown and described.

4. In a brake operated through the medium of fluid pressures, the combination of the drawgears, the brake rigging, a fluid containing brake machine connected to the drawgears and the rigging, and a valve forming part of said brake machine and adapted to apply by closing, and by remaining open to not apply, brakes, substantially as shown and described.

5. In a brake operated through the medium of fluid pressures, the combination of the drawgears, the brake rigging, a fluid containing brake machine connected to the drawgears and the rigging, and an automatically determining valve lying within said machine, substantially as set forth and shown.

6. In a brake operated through the medium of fluid pressures, the combination of the drawgears, the brake rigging, a fluid containing brake machine connected to the drawgears and the rigging, and a valve lying within and forming part of said brake machine, said valve being adapted to disable brakes upon the dissimultaneous impacts of drawgears.

7. In a brake mechanism for cars operated through the medium of independently acting drawgears, the combination of the said drawgears having a centrally balanced unbroken fluid connection, with a brake applying machine lying within said connection adapted to apply or maintain brake shoe pressure only when the initial and pending inthrusts of the two drawgears on the same car are practically simultaneous.

8. In a hydraulic brake for cars substantially as hereinbefore described, the combination of a centrally located disabling or tripping valve which operates through the medium of a suitable fluid to prevent the application, or the continuance, of brake shoe pressure under compulsion of certain related initial movements of the two independently moving drawgears with said drawgears, as set forth.

9. In a hydraulic brake applying machine for cars operated through the medium of longitudinally moving drawgears, the combination of a brake machine, with a centrally located tripping or disabling valve, which operates to prevent the application or continuance of brake shoe pressure whenever the inthrust of the two drawgears of a car, and the consequent opposed fluid pressures, are not sufficiently simultaneous.

10. In a system of momentum brakes, the combination of the foundation brakes, the two oppositely ended longitudinally moving drawgears or buffing apparatus, a brake machine, fluid connections between the said drawgears and machine and between said machine and the foundation brakes, a valve lying within and forming part of said machine, all the parts being so constructed and arranged as that the said brake machine will automatically apply the brakes, or fail to apply the brakes, in response to the simultaneousness or lack of simultaneousness, of the drawgear and the consequent fluid compressions.

11. In a car brake, the combination of the oppositely ended longitudinally moving drawgears, the foundation brakes, fluid connections between the drawgears and foundation brakes, a brake applying device lying within said connections, and a balanced valve arranged substantially as shown and described for disabling the brake applying device when the inthrust movements of the drawgears are not sufficiently simultaneous.

12. In a car brake, substantially as hereinbefore shown and described, the combination of the two drawgears capable of independent motion, fluid connections therefrom through a brake machine to the foundation brake rigging, and a balanced valve lying within said connections for automatically disabling the brake mechanism and releasing the brakes if such movements of the drawgears are not sufficiently simultaneous, as set forth.

13. In a car brake, the combination of the foundation brakes, two oppositely ended longitudinally moving drawgears, fluid connections from said drawgears to the brake rigging, brake applying mechanism lying within and forming part of said connections, and a centrally located balanced valve arranged substantially as shown and described for temporarily disabling or disconnecting said brake applying mechanism when the inthrust movements of the drawgears are not sufficiently simultaneous.

14. In a car brake, substantially as hereinbefore shown and described, the combination of the oppositely arranged and independently acting drawgears located at the respective ends of the car, fluid connections therefrom to the foundation brake levers or rigging through a brake applying mechanism operable by the movement of the said drawgears and a tripping or disabling valve to release, or prevent the operation of, the brakes when the drawgear movements are dissimultaneous, all the parts being so arranged as that the brakes will remain off during the continuation of the same compression.

15. In a brake operated through the medium of fluid pressures by the simultaneous impact of drawgears upon said fluids, the combination of a fluid containing brake machine having a valve, with a brake applying motor, substantially as shown and described.

16. The combination of the drawgears and brake rigging of a car, a fluid connection between the drawgears with a valve controlled motor connected to the brake rigging and adapted to apply brakes, substantially in the manner described.

17. The fluid motor 38 connected to the brake rigging and to both drawgears and adapted to apply brakes only during simultaneous impacts or inthrusts of drawgears.

18. The combination of the centrally located fluid motor 38, connections therefrom to the brake rigging upon both trucks, and fluid connections to the drawgears with said drawgears and brake apparatus, substantially as shown and described.

19. In a car brake substantially as hereinbefore described, the combination of a brake machine, a motor or ram, with self equalizing connections between the motor and brakes upon both trucks; substantially as shown and described.

20. In a hydraulic brake, the combination of the drawgears, a fluid containing pipe between the drawgears the brake rigging connected to the said pipe through a ram or motor, with said motor, as and for the purposes set forth.

21. In a hydraulic brake, the combination of the brake rigging, the drawgears, a fluid containing pipe, provided with a valve extending between the drawgears, a motor attached to the brake rigging and connected to and adapted to be controlled by the aforesaid valve, whereby the closure of the valve will effect brake applications through the medium of the motor.

22. An independent hydraulic brake machine connected to the brake rigging and to the drawgears and provided with a brake motor and an overflow reservoir and having an automatically determining valve adapted to operate, substantially as and for the purpose set forth.

23. A fluid containing brake machine connected to the brake rigging and the drawgears, adapted to transmit drawgear pressures to the brakes, in combination with a supply or overflow reservoir or chamber, as and for the purpose set forth.

24. In combination with the fluid containing brake machine substantially as hereinbefore described, a supply reservoir arranged somewhat above and connected to the said machine, as and for the purposes set forth.

25. The independent hydraulic brake machine connected to the brake rigging and the drawgears of a car and adapted to operate the former by the compressions of the latter as described, in combination with an independent liquid supplying reservoir mounted upon the car above the machine, substantially as and for the purpose set forth.

26. In a brake operated through the medium of fluid pressures, the combination of the drawgears, the brake rigging, a fluid containing brake machine, provided with a valve, connected to the drawgears and the rigging, and a reservoir arranged to receive fluid pressures from the machine while the valve remains open, as and for the purposes set forth.

27. In a brake operated through the medium of longitudinally moving drawgears and fluid pressures, the combination of a brake machine having a centrally located valve chamber, a pipe opening out from said valve chamber midway of its length, and a reservoir connected to said pipe and adapted to receive fluid pressures while the valve is open, substantially as shown and described.

28. In a fluid containing brake machine, the combination of the automatically determining valve 41 the relief pipe 44 and the reservoir 45 arranged above the valve and provided with the perforated cap 46, as and for the purposes set forth.

29. In a hydraulic brake, substantially as hereinbefore described, the combination of the centrally located automatically determining valve, the drawgears, pipe connections between the valve chamber and the drawgears, the pipe 40 opening centrally from the valve chamber, the motor 38 having an inwardly traveling piston, and the brake rigging attached thereto, all adapted to operate substantially as and for the purposes set forth.

30. In a hydraulic brake, substantially as hereinbefore described, the combination of the centrally located automatically determining valve, the drawgears, pipe connections between the valve chamber and the drawgears, connections between the valve chamber and the brakes, a brake applying motor lying within said connections, and a reservoir having a pipe connection with the valve chamber, and the parts being so arranged that the said reservoir will receive fluid pressures when the valve is open and the motor cylinder when it is closed.

31. In an automatic train brake, the combination of the longitudinally moving drawgears having draw-springs as shown, with the braking mechanism having fluid connections therewith and with the brake rigging, all the parts being so constructed and arranged that violent breakaways will compel the drawsprings to apply the brakes, as set forth.

32. In a brake operated through the medium of fluid pressures, the combination of the drawgears having draw-springs, the brake rigging, a fluid containing brake machine connected to the brake rigging and through the medium of the springs to the drawbars whereby the resilience of the springs will apply brakes, as shown and described.

33. In a brake operated through the medium of fluid pressure by the simultaneous impacts of drawgears, a permanent way or conduit extending between the drawgears, substantially as and for the purpose set forth.

34. The combination in a railway train, of a series of hydraulic brake machines, one upon each car of the train, connected to its drawgears, and dependent upon their simultaneous inthrusts, with said drawgears, as set forth.

35. The combination in a railway train, of a series of independent brake machines, one upon each car of the train, fluid connections between each machine and the drawgears upon the same car, with the drawgears, all the parts being so arranged that the brake machine will apply brakes only when impacts from neighboring cars or the expansion of the opposed drawsprings are sufficiently simultaneous.

WILLIAM B. GUERNSEY.

Witnesses:
HERBERT KNIGHT,
L. WOOLSEY.